(12) United States Patent
Burkholz

(10) Patent No.: US 10,836,374 B2
(45) Date of Patent: Nov. 17, 2020

(54) METHOD FOR OPERATING A HYBRID ELECTRIC VEHICLE AND HYBRID ELECTRIC VEHICLE

(71) Applicants: Hyundai Motor Company, Seoul (KR); Kia Motors Corporation, Seoul (KR)

(72) Inventor: Joris Burkholz, Darmstadt (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/375,341

(22) Filed: Apr. 4, 2019

(65) Prior Publication Data

US 2020/0231138 A1    Jul. 23, 2020

(30) Foreign Application Priority Data

Jan. 18, 2019  (DE) .................. 10 2019 200 653

(51) Int. Cl.
| | |
|---|---|
| *B60K 6/00* | (2006.01) |
| *B60W 20/17* | (2016.01) |
| *H04M 1/60* | (2006.01) |
| *B60K 6/22* | (2007.10) |
| *B60W 10/06* | (2006.01) |
| *B60W 10/08* | (2006.01) |

(52) U.S. Cl.
CPC .............. *B60W 20/17* (2016.01); *B60K 6/22* (2013.01); *B60W 10/06* (2013.01); *B60W 10/08* (2013.01); *H04M 1/6075* (2013.01); *B60Y 2306/09* (2013.01)

(58) Field of Classification Search
CPC .............. B60W 20/17; B60W 50/035; B60W 50/0097; B60L 50/30; B60L 50/61
See application file for complete search history.

(56) References Cited

U.S. PATENT DOCUMENTS

| | | | |
|---|---|---|---|
| 6,421,600 B1 * | 7/2002 | Ross ...................... | B60L 50/30 701/117 |
| 6,907,325 B1 | 6/2005 | Syed et al. | |
| 7,817,019 B2 * | 10/2010 | Lesesky .............. | B60R 16/0315 307/10.1 |
| 8,432,131 B2 * | 4/2013 | Lowenthal ............ | G07F 15/005 320/109 |

(Continued)

*Primary Examiner* — Hau V Phan
(74) *Attorney, Agent, or Firm* — Mintz Levin Cohn Ferris Glovsky and Popeo, P.C.; Peter F. Corless

(57) ABSTRACT

A method for operating a hybrid electric vehicle and hybrid electric vehicle are provided. The vehicle includes an internal combustion engine and an electric engine, which are operated by an electric controller, and a telecommunication system is communicatively coupled to the electric controller. The method includes determining if a telecommunication session is initiated or ongoing by the telecommunication system based on communication data provided by the telecommunication system to the electric controller. A current driving condition of the vehicle is determined based on driving data obtained by the electric controller to determine if an electric driving mode of the hybrid electric vehicle is feasible for the current driving condition. The hybrid electric vehicle is operated in the electric driving mode during the telecommunication session while the electric driving mode is feasible.

8 Claims, 3 Drawing Sheets

(56) References Cited

U.S. PATENT DOCUMENTS

| | | | |
|---|---|---|---|
| 8,493,022 B2* | 7/2013 | Bertness | G01R 31/3648 |
| | | | 320/104 |
| 8,798,832 B2* | 8/2014 | Kawahara | B60L 50/61 |
| | | | 701/22 |
| 9,751,521 B2* | 9/2017 | Schwartz | B60W 50/0097 |
| 9,859,709 B2* | 1/2018 | Sakamoto | B60L 53/64 |
| 9,878,631 B2* | 1/2018 | Hyde | B60L 11/1861 |
| 2011/0231049 A1* | 9/2011 | Le Brusq | B60K 6/48 |
| | | | 701/22 |
| 2016/0264021 A1* | 9/2016 | Gillett | B60K 1/04 |
| 2016/0272219 A1* | 9/2016 | Ketfi-Cherif | B60W 50/035 |
| 2018/0345951 A1* | 12/2018 | Saito | B60L 15/2045 |

* cited by examiner

METHOD FOR OPERATING A HYBRID ELECTRIC VEHICLE AND HYBRID ELECTRIC VEHICLE

CROSS-REFERENCE TO RELATED APPLICATION(S)

This application is based on and claims the benefit of priority to German Patent Application No. 102019200653.1, filed on Jan. 18, 2019, the disclosure of which is incorporated herein in its entirety by reference.

TECHNICAL FIELD

The present invention relates to a method for operating a hybrid electric vehicle and a hybrid electric vehicle, and more particularly, to a method for operating a hybrid electric vehicle that reduces noise within the cabin of the vehicle during telecommunication by operating the vehicle in an electric driving mode.

BACKGROUND

Current hybrid electric vehicles (HEV), for example plug-in hybrid electric vehicles (PHEV) or extended range electric vehicles (EREV), are increasingly provided with innovative devices for improving comfort and reducing noise, vibrations and harshness (NVH), that is any objective or subjective acoustical nuisance of the vehicle's occupants. A high level of interior NVH experienced by the occupants may decrease passenger satisfaction and may provide a difficult environment for conducting phone calls or other telecommunication. In general, distractions imposed on the occupants should be reduced. Accordingly, the noise inside a vehicle cabin should be minimized, in particular during phone calls or similar.

SUMMARY

The present invention provides a method for operating a hybrid electric vehicle that reduces noise within the cabin of the vehicle during telecommunication by operating the vehicle in an electric driving mode.

According to an aspect of the invention, a method is provided for operating a hybrid electric vehicle having an internal combustion engine and an electric engine, which are operated by an electric control unit, and having a telecommunication system being communicatively coupled to the electric control unit. The method may include determining if a telecommunication session is initiated and/or ongoing by the telecommunication system based on communication data provided by the telecommunication system to the electric control unit; determining a current driving condition of the hybrid electric vehicle based on driving data provided by the electric control unit; determining, by the electric control unit, if an electric driving mode of the hybrid electric vehicle is feasible for the current driving condition; and operating the hybrid electric vehicle, by the electric control unit, in the electric driving mode during the telecommunication session when the electric driving mode is feasible.

According to another aspect of the invention, a hybrid electric vehicle may include an internal combustion engine; an electric engine; an electric control unit configured to operate the internal combustion engine and the electric engine; and a telecommunication system communicatively coupled to the electric control unit. In particular, the telecommunication system may be configured to provide communication data to the electric control unit, the communication data including information regarding whether a telecommunication session is initiated and/or ongoing by the telecommunication system. The electric control unit may be configured to provide driving data and determine a current driving condition of the hybrid electric vehicle based on the driving data. The electric control unit may further be configured to determine if an electric driving mode of the hybrid electric vehicle is feasible for the current driving condition. The electric control unit may then be configured to operate the hybrid electric vehicle in the electric driving mode during the telecommunication session when the electric driving mode is feasible.

Accordingly, the present invention may reduce noise within the cabin of a hybrid electric vehicle during phone calls or other telecommunication by operating the vehicle in an electric driving mode for the duration of the telecommunication session when possible based on constraints imposed by the current driving condition of the vehicle. Current driving conditions may be affected by and/or defined by, for example, requests of a driver and/or an assisted/autonomous driving system, e.g. requests for acceleration, deceleration etc. The electric control unit, e.g. an engine control module, may then be configured to determine these current driving conditions based on the driving data. The vehicle may maintain the electric driving mode until a significant change of the driving situation is initiated, for example when the driver's acceleration demands are higher than the electric engine is capable of delivering (e.g. a kick-down). Driving in an electric driving mode reduces noise and will ease the conversation during the communication session, which in turn results in improved comfort and safety.

In one particular example, the internal combustion engine may be deactivated and the vehicle may be operated based on the electric drive train. In another example, the internal combustion engine may not be switched off completely but merely be operated in a less noise generating mode (and potentially less power demanding mode) while the electric drive train is switched on (or e.g. recuperation is used). In addition, for a less noise generating mode an increased torque may be provided, e.g. recuperation with the electric engine against the internal combustion engine and increased torque at the internal combustion engine—i.e. a shifting of operation range. As a result, the driver and the other occupants may be less distracted during phone calls.

According to an exemplary embodiment of the invention, the electric driving mode may include a shutdown of the internal combustion engine. The internal combustion engine may be maintained deactivated until the current driving conditions require a reactivation of the internal combustion engine, in particular, when the electric engine is no longer capable of providing the required power. The internal combustion engine may thus be switched on and the vehicle may return to normal driving.

According to an exemplary embodiment of the invention, the telecommunication session may be conducted by a telephone integrated in and/or coupled to the telecommunication system. For example, the telecommunication system of the vehicle may include a vehicle telephone or the like. Alternatively or additionally, a mobile phone or other communication device may be coupled to the telecommunication system, for example via a hands-free device, a docking station or the like. A hands-free device within the meaning of the present invention may include any equipment capable of being used without the use of hands (e.g., via voice commands) or, in a wider sense, equipment which needs only limited use of hands. In one particular example, the hands-free device may provide a wireless link between a mobile phone and the telecommunication system of the vehicle, e.g. via Bluetooth or a similar wireless technology.

Thus, such devices include Bluetooth headsets, hands-free vehicles kits, personal navigation devices and so on. The telecommunication system may include speakers configured to transmit a caller's voice in a phone call and an embedded microphone, e.g. in a stereo unit, at a steering wheel or at any other appropriate place within the vehicle, e.g. a smartphone microphone. According to an exemplary embodiment of the invention, the internal combustion engine may be deactivated while a telephone call is conducted via the telecommunication system. However, the internal combustion engine may also be reactivated at any time, e.g. when the accelerator pedal is engaged.

Additionally, determining the feasibility of the electric driving mode may include determining a power demand of the current driving condition. When the available electric power of the electric engine is high enough to satisfy the respective demand, the internal combustion engine may be shut off. Otherwise, the vehicle may be maintained in a semi-electric mode, in which torque is provided by both engines, or a pure combustion mode, in which the electric engine is switched off. According to an exemplary embodiment of the invention, the electric driving mode may minimize acoustic noise and/or acoustic vibrations based on the determined power demand. Accordingly, depending on the specific request or driving condition, various different sources of acoustic noise may be eliminated and/or turned down in combination and/or alone to achieve an optimal sound reduction for the respective case.

According to an exemplary embodiment of the invention, operating the hybrid electric vehicle in the electric driving mode may further include automatically closing a window of the hybrid electric vehicle. The operating of the hybrid electric vehicle in the electric driving mode may further include automatically closing an exhaust valve of the hybrid electric vehicle. Additionally, the operating of the hybrid electric vehicle in the electric driving mode may include automatically disabling a sound generator of the hybrid electric vehicle. Operating the hybrid electric vehicle in the electric driving mode may further include automatically shifting to a longer gear ratio. Particularly, shifting to a longer gear ratios implies a lower rotational speed, i.e. revolutions per minute of the internal combustion engine, which thus operates more silently. Sound generators may include artificial sound generators like an Acoustic Vehicle Alerting System or the like, which may be required to signal the vehicle's presence to pedestrians, especially visually or aurally impaired pedestrians, but may be temporarily turned down in volume.

The invention will be described in greater detail with reference to exemplary embodiments depicted in the drawings as appended.

BRIEF DESCRIPTION OF THE DRAWINGS

The accompanying drawings are included to provide a further understanding of the present invention and are incorporated in and constitute a part of this specification. The drawings illustrate the exemplary embodiments of the present invention and together with the description serve to explain the principles of the invention. Other exemplary embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
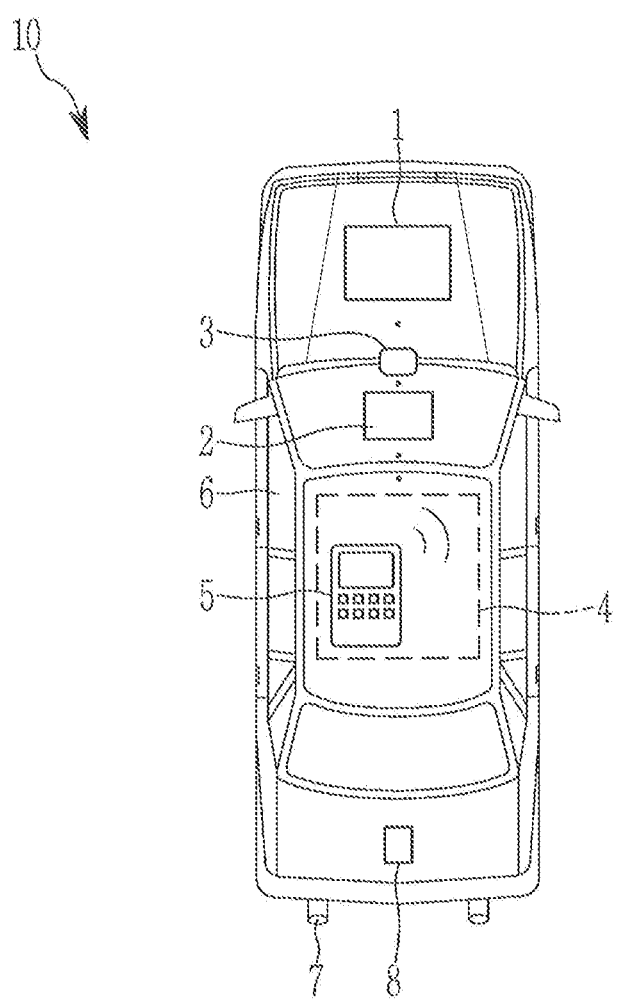
FIG. 1 schematically depicts a hybrid electric vehicle according to an exemplary embodiment of the invention.

Although specific exemplary embodiments are illustrated and described herein, it will be appreciated by those of ordinary skill in the art that a variety of alternate and/or equivalent implementations may be substituted for the specific exemplary embodiments shown and described without departing from the scope of the present invention. Generally, this application is intended to cover any adaptations or variations of the specific exemplary embodiments discussed herein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 schematically illustrates a hybrid electric vehicle 10 according to an exemplary embodiment of the invention. In particular, the hybrid electric vehicle 10 may include an internal combustion engine 1 and an electric engine 2. Both engines may be operated by an electric control unit 3 (e.g., a controller), which in this particular example is a single device coupled between both engines 1, 2. However, it will be clear to the person of skill that this arrangement and configuration is purely exemplary. Hence, in other exemplary embodiments, the electric control unit 3 may include several devices or controllers that are coupled with each other, e.g. a controller configured to operate the internal combustion engine 1 and another controller configured to operate the electric engine 2. Furthermore, it is understood, that the vehicle 10 may include more than two engines 1, 2 in other exemplary embodiments.

The vehicle 10 may further include a telecommunication system 4, which is communicatively coupled to the electric control unit 3. The telecommunication system 4 may include a telephone 5 that may either be integrated in the telecommunication system 4, e.g. as an integrated vehicle phone, or coupled to the telecommunication system 4 via a hands-free device, a docking station or similar. A driver and/or passenger of the vehicle 10 may thus conduct telephone calls using the telephone 5 and/or via a hands-free device of the telecommunication system 4, e.g. via a headset or similar. Any distraction of the driver should be avoided while performing the phone call. Thus, any acoustic noise potentially being generated within the vehicle 10 should be maximally reduced. Sources of noise may include, for example, wind, road noises, noise from the internal combustion engine 1, from exhaust valves, from sound generators, etc. In other words, the noise may be caused by any vehicle component.

The vehicle 10 in FIG. 1 is configured to generally minimize noise vibration harshness (NVH) levels during telecommunication sessions inside the vehicle 10, as will be described below. Particularly, the telecommunication system 4 may be configured to provide communication data to the electric control unit 3. The communication data may include information regarding whether a telecommunication session is initiated and/or ongoing by the telecommunication system 4. The electric control unit 3 and the telecommunication system 4 may further be coupled to an assisted and/or autonomous driving unit of the vehicle 10 (not depicted).

The electric controller 3 may be configured to obtain driving data and determine a current driving condition of the hybrid electric vehicle 10 based on the driving data. The driving data may include information regarding the current driving situation, e.g. whether the vehicle 10 is driving in a manual or an assisted/autonomous driving mode, whether the vehicle 10 is driving in an electric and/or internal combustion mode, or the like. The driving data may further include information regarding current parameters of the vehicle 10 such as current acceleration, speed, rotational speed of the internal combustion engine, gear ratio, fuel level and the like. The electric controller may be configured to obtain this driving data from various sensors mounted within the vehicle.

Further, the electric controller may be configured to analyze the driving data and define the current driving condition of the vehicle 10 based on the analysis result. For example, the vehicle 10 may be operated in overrun, i.e. the vehicle 10 travels without throttle, and thus, the internal combustion engine 1 may not be needed at least temporarily and thus could be switched off. In another example, the current driving condition may feature a kick-down phase, in which a driver requests maximum acceleration by engaging the accelerator pedal. In that case, it may not be optimal or possible to shut off the internal combustion engine 1 at least for some time period of time.

The electric controller 3 may be further configured to assess or determine if an electric driving mode of the hybrid electric vehicle 10 is feasible for the current driving condition. Hence, in the above example of an overrun phase, the electric driving mode may include a shutdown of the internal combustion engine 1. In the example of a kick-down phase however, a purely electric driving mode may not be feasible, at least for some time interval.

Generally, the electric controller 3 may be configured to determine a power demand of the current driving condition and determine the feasibility of the electric driving mode based on the result. The power demand may be generated by a driver and/or by an assisted/autonomous driving unit, for example. The electric driving mode may be selected, for example, to minimize acoustic noise and/or acoustic vibrations and thus minimize NVH. Accordingly, the electric controller 3 may be configured to execute optimization algorithms in which various control parameters and/or process variables of the vehicle 10 are provided as input. For example, for each source of noise one or several such parameters may be defined that characterize the influence of the respective source of noise on the NVH, e.g. a valve setting, a gear ratio, an engine control parameter and so on. The electric controller 3 may then be configured to formulate an electric driving mode that features a setting of parameter values minimizing the NVH inside the vehicle 10.

For example, operating the hybrid electric vehicle 10 in the electric driving mode may include automatically deactivating the internal combustion engine 1, automatically closing (partially or completely) one or several windows 6 of the vehicle 10, automatically closing (partially or completely) one or several exhaust valves 7 of the vehicle 10, automatically turning down or disabling a sound generator 8 of the vehicle 10, automatically shifting to a longer gear ratio, etc. The electric controller 3 may be further configured to operate the hybrid electric vehicle 10 in the electric driving mode during the telecommunication session while the electric driving mode is feasible. In the example of an overrun phase, the internal combustion engine 1 may thus be shut off during a telephone call via the telecommunication system 4. In the example of a kick-down phase, the vehicle 10 may remain in the current mode with the internal combustion engine 1 turned on.

However, the electric controller 3 may be configured to perform repeated checks, e.g. in short time intervals on the order of milliseconds or less, to determine if the internal combustion engine 1 may be switched off and an electric driving mode would be feasible. In yet another example, the internal combustion engine 1 may already be switched off when the telecommunication session is started. In that case, the electric controller may be configured to maintain the off state as long as possible. By switching off the internal combustion engine 1, the NVH inside the vehicle 10 may be significantly reduced and thus comfort and safety may be improved. The lower cabin noise eases the communication and the driver and/or passenger may better understand the contents of a phone call and thus may get less distracted by such noise.

Figure 2:
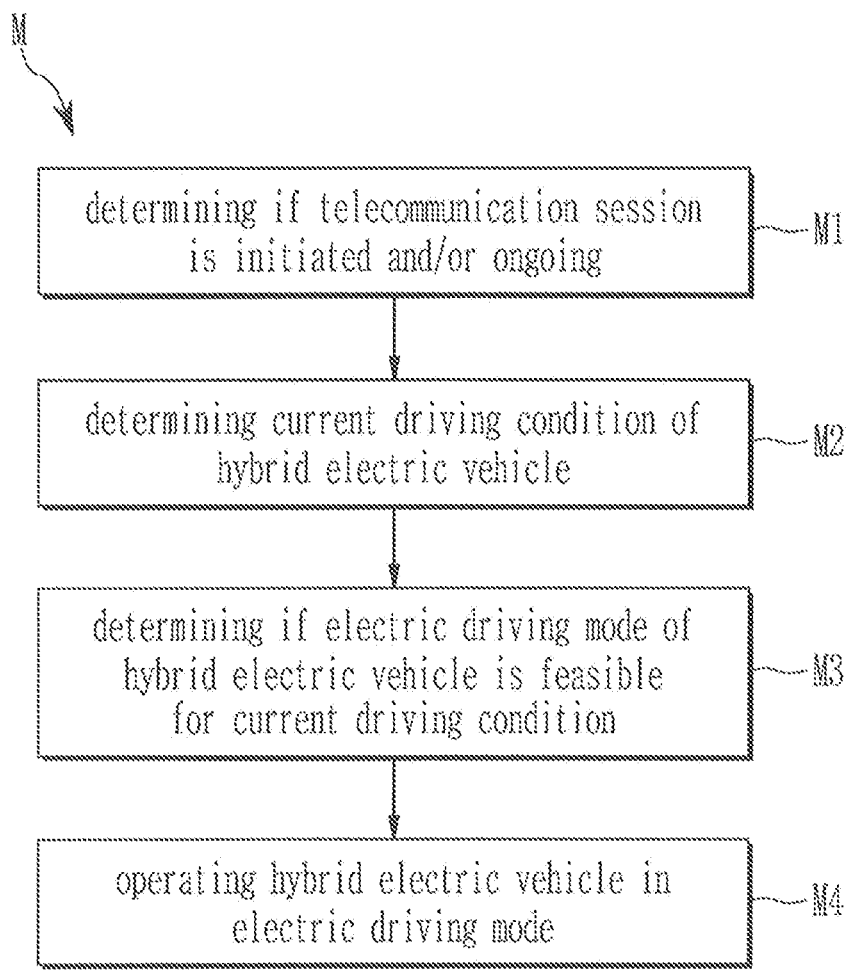
FIG. 2 shows a flow chart of a method for operating the hybrid electric vehicle of FIG. 1 according to an exemplary embodiment of the invention.

FIG. 2 shows a flow chart of a corresponding method M for operating the hybrid electric vehicle 10 of FIG. 1. The method M may include under M1 determining if a telecommunication session is initiated and/or ongoing by the telecommunication system 4 based on communication data provided by the telecommunication system 4 to the electric controller 3. The method may further include under M2 determining the current driving condition of the hybrid electric vehicle 10 based on the driving data provided by the electric controller 3 and determining under M3, by the electric controller 3, if an electric driving mode of the hybrid electric vehicle 10 is feasible for the current driving condition. Additionally, the method M may include under M4 operating the hybrid electric vehicle 10, by the electric controller 3, in the electric driving mode during the telecommunication session while the electric driving mode is feasible.

Figure 3:
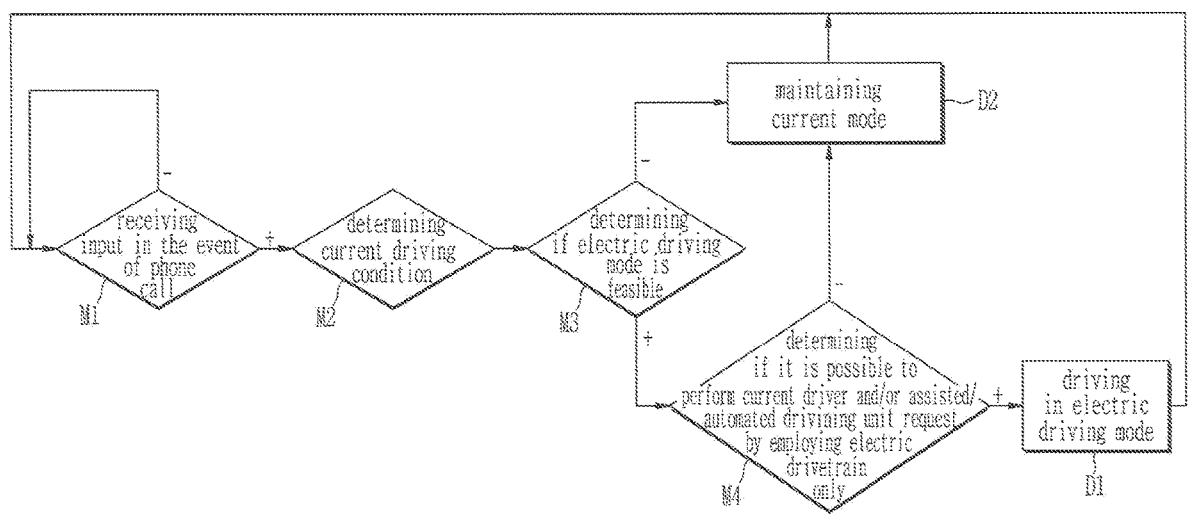
FIG. 3 shows another flow chart of the method of FIG. 2 according to an exemplary embodiment of the invention.

FIG. 3 exemplifies such a method M, in which a hybrid powertrain is controlled in the event of a phone call to increase safety and comfort in a vehicle 10 by reducing cabin noise. Under M1, the electric controller 3 may be configured to receive an input in the event of a phone call. The current driving condition of the vehicle 10 may be determined under M2. Next, when a phone call is conducted or received, the electric controller 3 may be configured to determine under M3 if an electric driving mode is feasible. Accordingly, the electric controller 3 may be configured to determine under M4 if it is possible to perform a current driver and/or an assisted/autonomous driving unit request (e.g. acceleration, deceleration, speed etc.) (e.g., an input request) by employing the electric drivetrain only. When the input request is possible, the electric controller 3 may be configured to shut down the internal combustion engine 1 under D1 to drive in the electric driving mode.

Furthermore, other actions may be performed by the electric controller 3 including automatically closing a window 6 of the hybrid electric vehicle 10, automatically closing an exhaust valve 7 of the hybrid electric vehicle 10, automatically disabling a sound generator 8 of the hybrid electric vehicle 10, automatically shifting to a longer gear ratio, and so on. However, if a deactivation of the internal combustion engine 1 is not possible, either because the electric driving mode is generally not feasible or the driver demands cannot be fulfilled, the electric controller 3 may be configured to maintain the current mode under D2 with the internal combustion engine 1 switched on. However, the electric controller 3 may be configured to perform repeated checks to determine if the internal combustion engine 1 may be switched off. If the internal combustion engine 1 is already switched off then the electric controller 3 may be configured to maintain the switched off status as long as possible or feasible.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The exemplary embodiments were chosen and described in order to explain the principles of the invention and its practical applications, to thereby enable others skilled in the art to utilize the invention and various exemplary embodiments with various modifications as are suited to the particular use contemplated. Many other examples will be apparent to one skilled in the art upon reviewing the above specification.

REFERENCE LIST 1 internal combustion engine
2 electric engine
3 electric controller
4 telecommunication system
5 telephone
6 window
7 exhaust valve
8 sound generator
10 hybrid electric vehicle
M method
M1-M4 method steps
D1-D2 method steps/decisions

What is claimed is:

1. A method for operating a hybrid electric vehicle having an internal combustion engine and an electric engine, operated by an electric controller, and having a telecommunication system communicatively coupled to the electric controller, the method comprising:
  determining, by the electric controller, if a telecommunication session is initiated or ongoing by the telecommunication system based on communication data provided by the telecommunication system to the electric controller;
  determining, by the electric controller, a current driving condition of the hybrid electric vehicle based on driving data obtained by the electric controller;
  determining, by the electric controller, if an electric driving mode of the hybrid electric vehicle is feasible for the current driving condition; and
  operating, by the electric controller, the hybrid electric vehicle in the electric driving mode during the telecommunication session while the electric driving mode is feasible,
  wherein the electric driving mode includes a shutdown of the internal combustion engine,
  wherein the telecommunication session is conducted by a telephone intergrated in or coupled to the telecommunication system, and
  wherein the internal combustion engine is deactivated while a telephone call is conducted via the telecommunication system.

2. The method according to claim 1, wherein determining the feasibility of the electric driving mode includes:
  determining, by the electric controller, a power demand of the current driving condition.

3. The method according to claim 2, wherein the electric driving mode minimizes at least one of acoustic noise and acoustic vibrations based on the determined power demand.

4. The method according to claim 3, wherein operating the hybrid electric vehicle in the electric driving mode includes at least one of:
  automatically closing, by the electric controller, a window of the hybrid electric vehicle;
  automatically closing, by the electric controller, an exhaust valve of the hybrid electric vehicle;

automatically disabling, by the electric controller, a sound generator of the hybrid electric vehicle; and automatically shifting, by the electric controller, to a longer gear ratio.

5. A hybrid electric vehicle, comprising:
an internal combustion engine;
an electric engine;
an electric controller configured to operate the internal combustion engine and the electric engine; and
a telecommunication system communicatively coupled to the electric controller;
wherein the telecommunication system is configured to provide communication data to the electric controller, the communication data including information regarding whether a telecommunication session is initiated or ongoing by the telecommunication system;
wherein the electric controller is configured to:
  obtain driving data and determine a current driving condition of the hybrid electric vehicle based on the driving data;
  determine if an electric driving mode of the hybrid electric vehicle is feasible for the current driving condition; and
  operate the hybrid electric vehicle in the electric driving mode during the telecommunication session while the electric driving mode is feasible,
  wherein the electric driving mode includes a shutdown of the internal combustion engine,
  where in the telecommunication session is conducted by a telephone integrated in or coupled to the telecommunication system, and
  wherein the internal combustion engine is deactivated while a telephone call is conducted via the telecommunication system.

6. The hybrid vehicle according to claim 5, wherein in determining the feasibility of the electric driving mode, the electric controller is further configured to:
  determine a power demand of the current driving condition.

7. The hybrid vehicle according to claim 6, wherein the electric driving mode minimizes at least one of acoustic noise and acoustic vibrations based on the determined power demand.

8. The hybrid vehicle according to claim 7, wherein in operating the hybrid electric vehicle in the electric driving mode, the electric controller is further configured to execute at least one of:
  automatically closing a window of the hybrid electric vehicle;
  automatically closing an exhaust valve of the hybrid electric vehicle;
  automatically disabling a sound generator of the hybrid electric vehicle; and automatically shifting to a longer gear ratio.

* * * * *